(12) United States Patent
Batke et al.

(10) Patent No.: US 7,747,764 B2
(45) Date of Patent: Jun. 29, 2010

(54) WEB ACCESS FOR NON-TCP/IP CONTROL DEVICES OF AN INDUSTRIAL CONTROL SYSTEM

(75) Inventors: Brian A. Batke, Novelty, OH (US); Gary W. Baczkowski, Seven Hills, OH (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1424 days.

(21) Appl. No.: 09/964,916

(22) Filed: Sep. 27, 2001

(65) Prior Publication Data

US 2002/0156837 A1 Oct. 24, 2002

Related U.S. Application Data

(60) Provisional application No. 60/285,178, filed on Apr. 20, 2001.

(51) Int. Cl.
*G06F 15/16* (2006.01)
(52) U.S. Cl. .................................................. 709/230
(58) Field of Classification Search ................. 700/83, 700/18, 19, 9; 709/217, 218, 219, 230, 203, 709/227–229, 236, 237, 201; 715/733
See application file for complete search history.

(56) References Cited

U.S. PATENT DOCUMENTS

| | | | |
|---|---|---|---|
| 5,805,442 A | | 9/1998 | Crater et al. |
| 5,966,519 A | * | 10/1999 | Keeley ........................... 716/5 |
| 5,975,737 A | | 11/1999 | Crater et al. |
| 5,982,362 A | | 11/1999 | Crater et al. |
| 6,006,258 A | * | 12/1999 | Kalajan ....................... 709/219 |
| 6,061,603 A | | 5/2000 | Papadopoulos et al. |
| 6,151,625 A | | 11/2000 | Swales et al. |
| 6,282,454 B1 | | 8/2001 | Papadopoulos et al. |
| 6,311,101 B1 | * | 10/2001 | Kastner ....................... 700/197 |

(Continued)

FOREIGN PATENT DOCUMENTS

WO WO 99/13418 A1 3/1999

OTHER PUBLICATIONS

Stevens, Richard W.; TCP/IP Illustrated: The Protocols; 1994; Addison Wesley; vol. 1; p. 34.*

*Primary Examiner*—Asad M Nawaz
*Assistant Examiner*—Jason Recek
(74) *Attorney, Agent, or Firm*—Boyle Frederickson LLP; R. Scott Speroff; John M. Miller

(57) ABSTRACT

A new industrial control system and method are disclosed allowing for communication between multiple control devices of the system and remote devices via the Internet. The system includes a web access interface that is capable of being coupled to the remote devices via the Internet, and is coupled to the control devices by way of a network. A program executed by the interface receives an Internet signal having socket API data and formatted in accordance with the TCP/IP protocol, and extracts the data from the Internet signal. Another program executed by the interface receives the data and transmits a network signal, which includes the data but is not formatted in accordance with the TCP/IP protocol, to an appropriate one of the control devices, each of which has a respective web server program. The data is processed by the server program at the appropriate control device.

12 Claims, 3 Drawing Sheets

U.S. PATENT DOCUMENTS

| | | | |
|---|---|---|---|
| 6,324,583 B1 * | 11/2001 | Stevens | 709/230 |
| 6,714,977 B1 * | 3/2004 | Fowler et al. | 709/224 |
| 6,721,286 B1 * | 4/2004 | Williams et al. | 370/282 |
| 6,721,799 B1 * | 4/2004 | Slivkoff | 709/236 |
| 6,732,191 B1 * | 5/2004 | Baker et al. | 710/1 |
| 6,735,630 B1 * | 5/2004 | Gelvin et al. | 709/224 |
| 6,799,195 B1 * | 9/2004 | Thibault et al. | 709/203 |
| 6,801,920 B1 * | 10/2004 | Wischinski | 707/203 |
| 6,850,979 B1 * | 2/2005 | Saulpaugh et al. | 709/225 |
| 6,904,600 B1 * | 6/2005 | James et al. | 719/328 |
| 6,910,068 B2 * | 6/2005 | Zintel et al. | 709/220 |
| 6,970,935 B1 * | 11/2005 | Maes | 709/230 |
| 7,010,573 B1 * | 3/2006 | Saulpaugh et al. | 709/206 |
| 7,080,150 B1 * | 7/2006 | Wehrle et al. | 709/230 |
| 7,085,814 B1 * | 8/2006 | Gandhi et al. | 709/208 |
| 7,099,950 B2 * | 8/2006 | Jones et al. | 709/230 |
| 7,200,671 B1 * | 4/2007 | Lev-Ami et al. | 709/232 |
| 7,359,876 B1 * | 4/2008 | Redpath et al. | 705/37 |
| 2001/0003804 A1 | 6/2001 | Papadopoulos et al. | |
| 2001/0014833 A1 | 8/2001 | Brault | |
| 2002/0046239 A1 * | 4/2002 | Stawikowski et al. | 709/203 |
| 2002/0059467 A1 * | 5/2002 | Rapp et al. | 709/250 |
| 2002/0065960 A1 * | 5/2002 | Swales et al. | 710/5 |
| 2004/0024891 A1 * | 2/2004 | Agrusa et al. | 709/230 |

* cited by examiner

WEB ACCESS FOR NON-TCP/IP CONTROL DEVICES OF AN INDUSTRIAL CONTROL SYSTEM

CROSS REFERENCE TO RELATED APPLICATIONS

This application claims the benefit of U.S. provisional patent application No. 60/285,178, filed on Apr. 20, 2001.

STATEMENT REGARDING FEDERALLY SPONSORED RESEARCH OR DEVELOPMENT

--

FIELD OF THE INVENTION

The present invention relates generally to industrial control systems for industrial processes, and in particular to systems for providing web access to programmable logic controllers, I/O modules and other control devices of such industrial control systems.

BACKGROUND OF THE INVENTION

Industrial control systems used to control and monitor industrial processes often employ programmable logic controllers (PLCs) that are in turn coupled to input/output (I/O) modules that are in communication with elements or aspects of the industrial processes of interest. PLCs are special purpose computers that operate based upon stored control programs and typically read inputs from and provide outputs to the controlled industrial process based upon the logic of the control program.

PLCs differ from conventional computers in two major respects. First, PLCs operate to produce highly reliable and predictable control outputs. The architecture and programming of PLCs are designed so as to provide predictable maximum response times, as well as a reduction in errors caused by race conditions and sensitive detection of hardware and communication errors. Second, PLCs differ from conventional computers in that PLCs are highly customizable so as to fit the demands of the particular industrial processes being controlled.

Depending upon the particular industrial process being controlled, an industrial control system can take a variety of forms. In some circumstances, the industrial control system includes numerous I/O modules that are all in communication with a single PLC. In other circumstances, multiple PLCs are employed in the industrial control system. The multiple PLCs are networked together, and each PLC is in communication with its own particular associated I/O modules. Still in additional circumstances, an industrial control system can take other forms that can include, for example, other types of modules.

Although it is the PLCs of industrial control systems that primarily govern the operation of the industrial control systems and the industrial processes of interest, in a variety of circumstances it is desirable to be able to remotely monitor (and, in some instances, control) the operation of the industrial control systems and the progress of the industrial processes. Conventional industrial control systems allow for communications between the PLCs and remote human machine interfaces such as computer terminals by way of proprietary communication links or dedicated phone lines.

Given the continued development and growth of the Internet or World Wide Web (or simply the "web") as a preferred system for allowing communications among a variety of computers and computer systems around the world, it would be particularly desirable if PLCs, I/O modules or other control devices could be remotely accessed by way of the web. However, the current structure of industrial control systems makes this difficult. Communications with the web requires certain physical hardware and software for interfacing with the web, which can be difficult and costly to add onto or implement on existing PLCs, I/O modules, and other control devices.

In particular, communication via the web typically occurs by way of the TCP/IP protocol, which allows both for the proper addressing of signals and also the packetizing of signal data into smaller amounts of data that are transmitted via the web and then reassembled upon arrival at the appropriate signal destination. The software programs employed in receiving and transmitting signals over the web by way of the TCP/IP protocol can require significant processing power and memory, which often are not available on existing PLCs, I/O modules or other control devices.

At the same time, it is often desirable to allow for direct access of individual PLCs, I/O modules and other control devices of an industrial control system rather than simply access of the industrial control system as a whole. Such individualized access is desirable insofar as the different control devices are typically performing different tasks and are of independent interest from the perspectives of monitoring and control. Consequently, the difficulty and costs of adding the necessary hardware and software to allow for web access of an industrial control system are multiplied by the number of PLCs, I/O modules and other control devices for which web access is desired.

It would therefore be advantageous if a new industrial control system could be developed that would make it possible for remote computer terminals and other remote devices to access and communicate with the industrial control system by way of the web. It would be especially advantageous if the new industrial control system could be designed so that the amount of costly hardware and software that was necessary for allowing web communications was kept to a minimum. Specifically, for example, it would be advantageous if the new industrial control system encompassing multiple PLCs, I/O modules, or other control devices did not require each of those control devices to include and process memory-intensive software relating to the handling of the TCP/IP protocol associated with web signals.

At the same time, it would be advantageous if the new industrial control system allowed for the remote computer terminals and other remote devices to access and communicate with individual PLCs, I/O modules, or other control devices of the new industrial control system having multiple such control devices, rather than simply the accessing of the industrial control system as a whole. It would be additionally advantageous if existing industrial control systems could be converted to allow for web access in the manner of the new industrial control system without significant difficulty or cost.

BRIEF SUMMARY OF THE PREFERRED EMBODIMENT

The present inventors have recognized that the competing goals of (1) being able to access individual control devices of the industrial control system by way of the web, and at the same time (2) minimizing the burdens of providing such web access to the individual control devices, can be met by dividing the web server functionality for the industrial control system into two parts. The first part of the web server functionality occurs at the individual control devices, and involves the processing of high-level (application-level) socket API data. The second part of the web server functionality occurs at a shared central "web access interface" and involves the processing of low-level web communication protocols.

More specifically, the web access interface handles the processing of the TCP/IP protocol and Internet MAC protocol with respect to the Internet signals being received from the web and the conversion of those signals into network signals in accordance with control network protocols and internal MAC protocols employed for communication internally within the industrial control system between the web access interface and the control devices. Conversely, the web access interface also handles the processing of the control network protocols and internal MAC protocols with respect to the network signals being received from the control devices and the conversion of those signals into Internet signals in accordance with the TCP/IP protocol and the Internet MAC protocol. Consequently, the individual control devices of the industrial control system only need to handle the processing of the socket API data (e.g., to perform ftp or http commands) and the processing of the particular protocols employed internally within the industrial control system to allow communication between the web access interface and the control devices. As a consequence, even control devices having relatively low amounts of memory and processing power are accessible from the web.

In particular, the present invention relates to an industrial control system for controlling an industrial process. The industrial control system includes a plurality of control devices each of which contributes to the controlling of the controlled process. Each control device includes a respective web server program. The industrial control system further includes a web access interface including an Internet interface and a control network interface. The control network interface is coupled to the plurality of control devices by way of a network, and the Internet interface is capable of being coupled to a remote device via the Internet. The web access interface executes an Internet communications program and a control network communications program. The Internet communications program receives an Internet signal having socket API data and formatted in accordance with a TCP/IP protocol. The Internet communications program extracts the socket API data from the Internet signal and provides a socket API signal including the socket API data. The control network communications program receives the socket API signal and transmits a network signal based upon the socket API signal to an appropriate one of the control devices in accordance with the Internet signal. The socket API data is included within the network signal and processed by the respective web server program at the one of the control devices, and the network signal is not formatted in accordance with the TCP/IP protocol.

The present invention additionally relates to a web access interface for implementation in an industrial control system having a plurality of control devices, where each of the control devices has a respective web server program. The web access interface includes a first means for receiving and transmitting Internet signals from and to the Internet, and a second means for receiving and transmitting network signals from and to the plurality of control devices. The web access interface further includes a third means for converting the Internet signals into the network signals, and for converting the network signals into the Internet signals, in order to allow for the communication of signals between the plurality of control devices and at least one remote device coupled to the first means by way of the Internet. The Internet signals are formatted in accordance with an Internet-type protocol and the network signals are not formatted in accordance with the Internet-type protocol.

The present invention further relates to a method of communicating information between a plurality of control devices within an industrial control system and a remote device coupled to the industrial control system by way of the Internet, where each of the control devices has a respective web server program. The method includes receiving a request signal at a web access interface, where the request signal has been provided over the Internet from the remote device. The method further includes processing an Internet media access control protocol and a TCP/IP protocol with respect to the request signal by way of an Internet communications program of the web access interface, in order to extract socket API data in the form of a socket API signal. The method additionally includes determining an appropriate destination control device from among the plurality of control devices, and formatting the socket API signal in accordance with a control network protocol and an internal media access control protocol to produce a network signal. The method further includes delivering the network signal to the appropriate destination control device so that the socket API data can be processed by the respective web server program.

DETAILED DESCRIPTION OF THE PREFERRED EMBODIMENT

Figure 1:
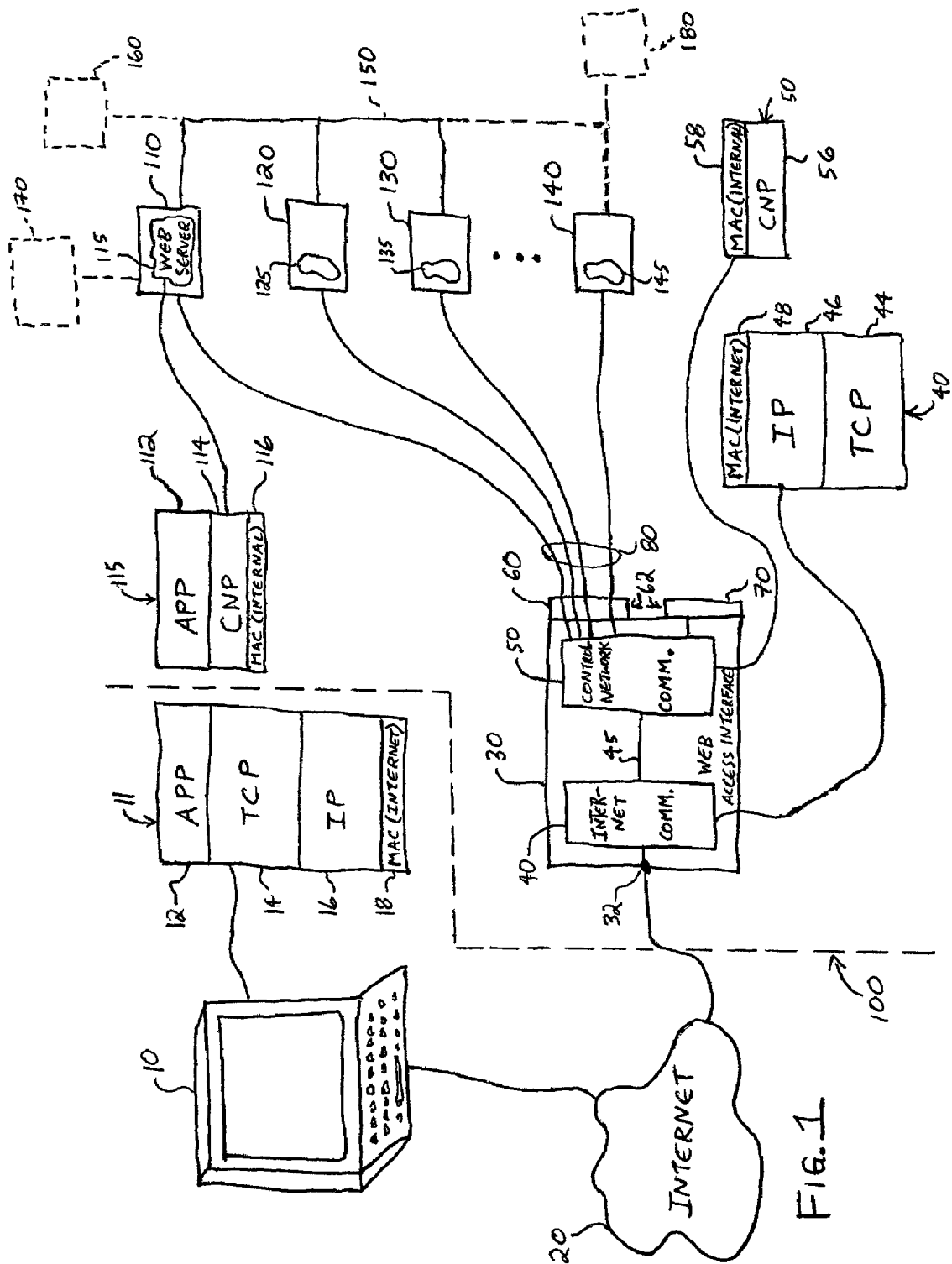
FIG. 1 is a schematic diagram showing an exemplary industrial control system having control devices and a web access interface that allows for communication between the control devices and one or more remote devices by way of the web.

Referring to FIG. 1, a new industrial control system 100 used to control an industrial process includes a web access interface 30 that is coupled to one or more control devices, which are shown as control devices 110, 120, 130 and 140. The web access interface 30 is capable of communications with one or more remote computer terminals or other remote devices 10 by way of the Internet or World Wide Web (or simply the "web") by way of an Internet interface 32. The web access interface 30 is also coupled to the control devices 110-140 by way of a control network interface 62 having one or more ports, which in this exemplary embodiment are shown to include a first port 60 and a second port 70. Communication links 80 in turn couple the network interface 62 with the control devices 110-140. The communication links 80 can be wire cable, fiber optic or wireless, and are typically a proprietary or specialized network suitable for industrial control.

Aside from the coupling of the web access interface 30 to one or more control devices, the new industrial control system 100 can vary in form. The control devices 110-140 in one embodiment are programmable logic controllers (PLCs), which are coupled to one another by way of a communications databus 150. As often occurs in conventional industrial control systems, the PLCs can be understood to be independently coupled to one or more input/output (I/O) modules or other control devices such as exemplary module 170, or coupled to such other control devices (such as exemplary module 180) by way of the databus 150. The I/O modules are employed to provide signals to, and to receive data from, specific elements or aspects of the controlled industrial process. One or more I/O modules can be controlled by any given PLC. In alternate embodiments, not all of the PLCs of the industrial control system 100 need to be coupled to one another by way of the same communications databus 150 (as shown in FIG. 1 by the dashed line coupling control device 140 with the remaining control devices 110-130).

In further alternate embodiments, the control devices 110-140 that are coupled to the web access interface 30 are I/O modules, rather than PLCs. In such an embodiment, the I/O modules can still be coupled to one another by way of the single communications databus 150, as well as coupled to one or more PLCs, I/O modules, or other control devices as indicated by exemplary modules 160, 170 and 180. Depending upon the embodiment, the various I/O modules can exist in different sub-groupings that can, but need not, all be coupled by way of the same communications databus 150. For example, I/O modules 110, 120 and 130 can all be coupled to and in communication with one another and with the exemplary module 160 (which can be a PLC), while I/O module 140 is coupled only to the exemplary module 180 (a different PLC).

The exact number of control devices that are coupled to the web access interface 30 can vary depending on the embodiment, from one control device to four control devices (as shown) to an even a larger number of control devices, as indicated by the dots shown in between control devices 130 and 140. Additionally, in certain embodiments of the industrial control system 100, the web access interface 30 itself is a PLC. Or, in still further embodiments, the various control devices that are coupled directly to the web access interface 30 are devices of a variety of different types. For example, in one alternate embodiment, control devices 110-130 are all I/O modules, and control device 140 is a PLC.

Although the type and nature of the control devices 110-140 that are coupled to the web access interface 30 can vary depending upon the embodiment, the control devices have certain features in common. In particular, each of the control devices 110-140 have one or more control capabilities with respect to, or access to information concerning, the controlled industrial process that are potentially of interest to remote users. Additionally, each of the control devices 110, 120, 130 and 140 includes a respective web server program 115, 125, 135 and 145, respectively, that is capable of receiving, processing and responding to network signals provided from the web access interface 30 that contain application-level socket API data originating from browser programs at the remote devices 10 and provided via the Internet 20 to the industrial control system 100. The web server programs 115-145 are further capable of providing application-level socket API data to the web access interface 30 for transmission to the remote devices 10.

Although the control devices 110-140 include the web server programs 115-145 for processing socket API data from the remote devices 10 (e.g., to perform ftp or http commands) and also providing socket API data back to the remote devices (e.g., to provide a command to a browser program), it is the web access interface 30 that makes it possible for the control devices 110-140 of the industrial control system 100 to communicate with the remote devices 10 by way of the Internet 20. The web access interface 30 in particular allows the control devices 110-140 to be accessible by way of the web even when those control devices do not have the processing power, memory or necessary software capability for recognizing and handling the protocol of signals received from the Internet or for providing signals onto the Internet.

As shown figuratively with respect to the remote device 10, in order for the remote device to provide signals over the Internet 20, the remote device 10 typically includes a set of programs 11. In order to generate socket API data for execution by web servers such as those at the control devices 110-140, as well as to process socket API data received from such web servers, the remote device 10 includes an application-level program 12, which typically is a web browser such as Internet Explorer commercially available from Microsoft Corporation of Redmond, Wash. Further, in order for signals to be transmitted over the Internet 20 in accordance with the Transfer Control Protocol (TCP), the Internet Protocol (IP) and the Internet Media Access Control (MAC) protocol, the remote device 10 includes a TCP program 14, an IP program 16 and an Internet MAC program 18.

As is well known in the art, the MAC protocol used over the Internet 20 is typically the Ethernet protocol, although other protocols can also be employed, such as the Token Ring protocol, FDDI protocol, ATM protocol, SONET protocol, X.25 protocol, or frame relay protocol. The IP protocol concerns an Internet address representative of the location of the destination network and station. The TCP protocol governs the connection between the source of the data (e.g., the remote device 10) and the destination for the data (e.g., the web access interface 30). Together, the TCP/IP protocols (often called the TCP/IP stack) govern the packetizing of data, that is, the breaking down of data associated with particular signals into smaller groupings or packets for transmission over the Internet, after which the packets of data are reassembled. In alternate embodiments, the UDP protocol can be used in place of the TCP protocol.

While the remote device 10 includes programs 14, 16, 18 for formatting socket API data in accordance with the TCP/IP protocol and the Internet MAC protocol prior to sending the information onto the Internet 20, and also for processing the signals received from the Internet with respect to the TCP/IP protocol and the Internet MAC protocol, the control devices 110-140 do not require such software. Rather, as shown, the web access interface 30 includes an Internet communications program 40 that includes programs for processing signals received from, and signals to be transmitted onto, the Internet 20. Specifically, the Internet communications program 40 includes an Internet MAC program 48 that handles the Internet MAC protocol with respect to incoming signals being received from the Internet 20, an IP program 46 for processing IP address information encoded on the incoming signals, and also a TCP program 44 for allowing communications to take place in accordance with the TCP protocol. Thus, when a signal from the Internet 20 is received by the Internet interface 32, the Internet communications program 40 translates that signal into a socket API signal 45 that only includes the application-level socket API data of the original signal, and is no longer formatted in accordance with the TCP/IP protocol or the Internet MAC protocol.

The web access interface 30 further includes a control network communications program 50, which further translates the socket API signal 45 into one or more network signals that can be transmitted via the communication links 80 to the control devices. The communication links 80 coupling the network interface 62 and the respective control devices 110-140 utilize one or more internal communications protocols (internal to the industrial control system), which can include an internal MAC protocol and a control network protocol (CNP). Thus, the control network communications program 50 includes an internal MAC program 58 for handling the internal MAC protocol and a CNP program 56 for handling the CNP protocol. The internal MAC protocol used over the communication links 80 is typically one of DeviceNet or ControlNet, although the protocol can vary depending on the embodiment. In certain embodiments, the internal MAC protocol and/or the CNP protocol can vary within a given industrial control system from one of the communication links 80 to another.

The control network communications program 50 transmits the network signals to the appropriate destination control devices 110-140, in accordance with the received IP address information, by way of the corresponding communication links 80. In order to receive incoming network signals from the communication links 80, the control devices 110-140 each have their respective web server programs 115-145. Each of the web server programs 115-145, such as program 115, has an internal MAC program 116 for handling the internal MAC protocol, and a CNP program 114 for providing an interface for CNP protocol, in addition to web server application software 112 for providing web server functionality that is responsive to the received socket API data.

The various web server programs 115-145, control network communications program 50 and Internet communications program 40 can allow communications either from the Internet 20 to the control devices 110-140 or in the opposite direction from the control devices to the Internet 20. That is, when the control devices 110-140 determine that particular socket API data (e.g., browser program instructions) should be sent to one or more remote devices 10 via the Internet 20, the corresponding web server programs 115-145 apply the appropriate CNP and internal MAC protocols so that the socket API data can be transmitted as network signals over the corresponding communication links 80 to the control network communications program 50. The control network communications program 50 then provides a corresponding socket API signal 45 to the Internet communications program 40, which formats the information in accordance with the TCP/IP protocol and the Internet MAC protocol for transmission over the Internet 20 to the appropriate remote device 10.

By virtue of the web access interface 30, remote devices 10 can interact with the web server programs 115-145 of the control devices 110-140 without the web server programs including the programming necessary for handling the TCP/IP protocol. Because such programming for handling the TCP/IP protocol typically requires significantly more memory and processing power than the programming required to handle the CNP protocol (as indicated figuratively by the relative sizes of the blocks corresponding to programs 46, 44 and 56), the control devices 110-140 can interact with the remote devices 10 by way of the Internet 20 even if the control devices have limited processing power and memory capabilities. The processing power and memory required to implement the programs 46, 44 for handling the TCP/IP protocol is limited to the Internet communications program 40 at the single web access interface 30.

The new industrial control system 100 therefore reduces the overall amount of processing power and memory that must exist within the industrial control system in order to carry on communications with remote devices 10 via the Internet 20, and further makes it possible to access various PLCs, I/O modules and other individual control devices of the industrial control system by way of the Internet 20, even though those devices are non-TCP/IP devices or the communication links 80 cannot support the TCP/IP protocol. In particular, the new industrial control system 100 makes it possible for remote users, by way of their remote devices 10, to monitor various information relating to the different control devices 110-140 and the elements or aspects of the industrial process controlled by those control devices, as well as, in some circumstances, to provide commands to those control devices from the remote locations of the users.

Because the web access interface 30 allows for the remote devices 10 to access typically a variety of different control devices 110-140 within the industrial control system 100, the web access interface 30 also typically determines which of the control devices is the appropriate destination for a given incoming signal from the Internet 20. In order to determine the appropriate destination for a given incoming signal off of the Internet 20, the Internet communications program 40 processes the IP address included within the IP protocol of the incoming signal, among its other functions. The Internet communications program 40 then provides an indication of the appropriate destination to the control network communications program 50 along with the socket API signal 45. The control network communications program 50 is thus able to determine the appropriate one of the communication links 80 (and, in certain embodiments, a corresponding port of the network interface 62) for transmitting a corresponding network signal to the appropriate one of the control devices 110-140.

In certain embodiments, a table can be used to determine appropriate control network addresses corresponding to particular control devices, based upon the IP addresses received in the Internet signals. In alternate embodiments, the Internet communications program 40 sends a signal that is separate from the socket API signal 45, potentially by way of a separate communication link, to the control network communications program 50 with the information indicating the appropriate one of the control devices to which the socket API data should be sent.

In the preferred embodiment, each of the web server programs 115-145 of the respective control devices 110-140 has an individual IP address associated with it. However, in alternate embodiments, the various web server programs 115-145 are identified merely as different ports (or other subunits) associated with a common IP address corresponding to the entire industrial control system 100 or at least to a particular shared entity, such as the web access interface 30. In cases where more than one of the control devices share a single IP address but are specifically identified by way of additional port information, the URL corresponding to those control devices typically takes the form of www.addressname/portname (as opposed to simply www.addressname). In embodiments where a table is employed to convert IP address information into control network address information, the table can be used to convert IP addresses and/or IP addresses plus port addresses into corresponding control network addresses.

Figure 2:
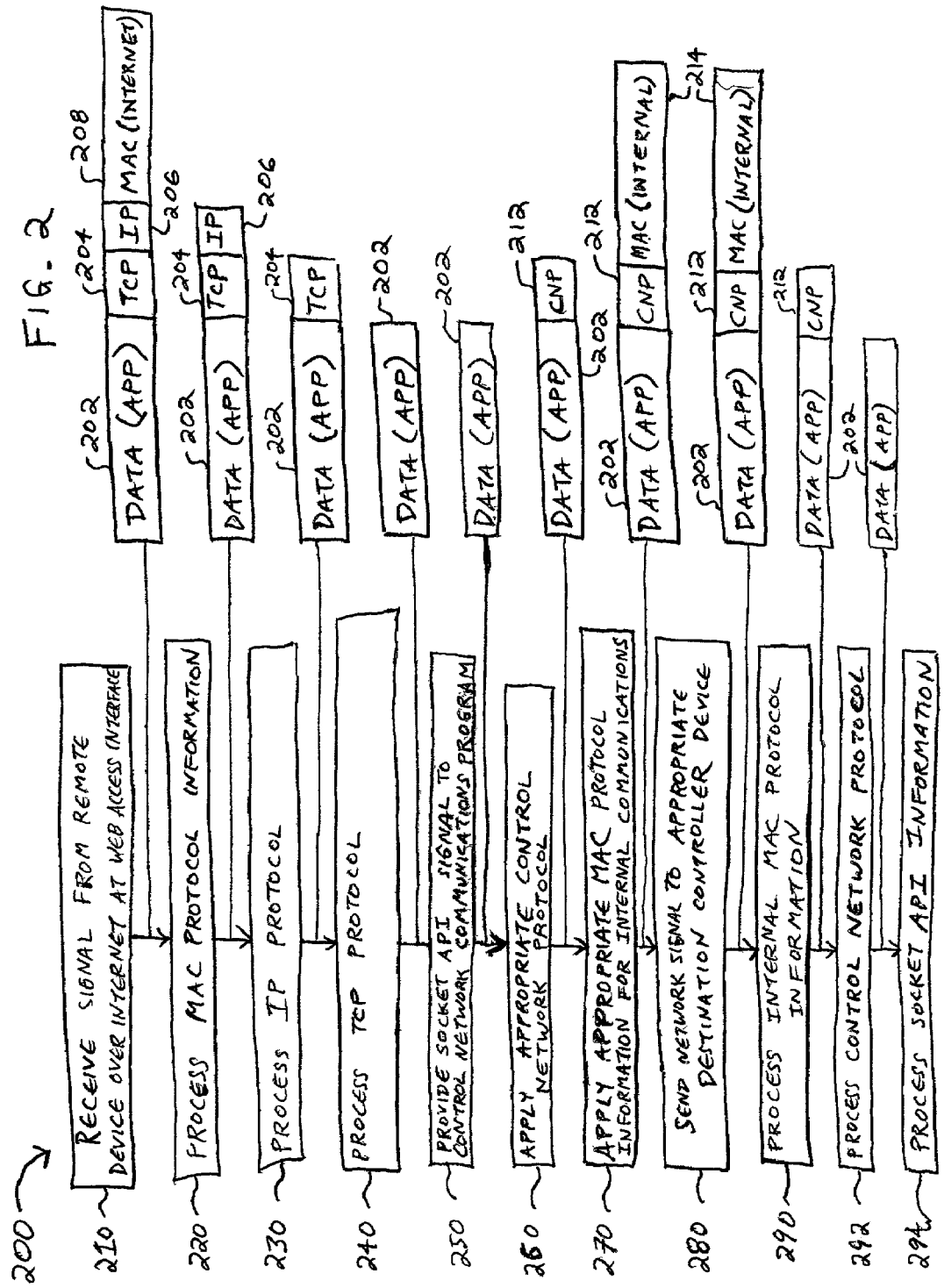
FIG. 2 is a flow chart showing exemplary steps of operation of the industrial control system of FIG. 1 concerning the communication of information from a remote device to a control device of the industrial control system.

Turning to FIG. 2, in one embodiment, the new industrial control system 100 performs several steps 200 in order to receive and process signals provided from the remote devices 10 via the Internet 20. In step 210, the web access interface 30 receives a signal from one of the remote devices 10 provided via the Internet 20. As shown, the signal includes application-level socket API data 202 that is formatted in accordance with the TCP protocol 204, the IP protocol 206, and the Internet MAC protocol 208. In step 220, the Internet communications program 40 handles the Internet MAC protocol 208, such that the original Internet signal is processed to include only the application-level data 202, and the TCP and IP protocol 204, 206. In step 230, the Internet communications program 40 processes the IP protocol 206 to determine an appropriate destination control device for the application-level data 202, such that the original Internet signal now only includes the application-level data 202 and the TCP protocol 204. Next, at step 240, the Internet communications program 40 processes the TCP protocol 204, such that the original Internet signal now includes only the application-level data 202, which forms the socket API signal 45. If multiple data packets corresponding to the same Internet signal were received from the Internet 20, the Internet communications program 40 reassembles those packets as part of its processing in steps 230 and 240.

At step 250, the socket API signal 45 including the application-level data 202 is provided from the Internet communications program 40 to the control network communications program 50. Depending upon the embodiment, the socket API signal 45 can include information indicative of the appropriate destination control device for the application-level data 202, as discussed above. At steps 260 and 270, respectively, the control network communications program 50 formats the socket API signal in accordance with the CNP protocol 212 and the internal MAC protocol 214, respectively, for allowing communications with the appropriate destination control device. Then at step 280, the web access interface 30 sends a network signal produced by the control network communications program 50 via the appropriate one of the communication links 80 to the appropriate one of the control devices 110-140. The network signal includes application-level data 202, the CNP protocol 212 and the internal MAC protocol 214. As the network signal is received by the appropriate one of the control devices 110-140, the appropriate corresponding one of the web server programs 115-145 processes the internal MAC protocol 214 at step 290, resulting in a signal having the application-level data 202 and the CNP protocol 212. Then at step 292, the web server program processes the CNP protocol 212 in order to isolate the application-level data 202. The web server program then can process the application-level socket API data 202 at step 294.

In alternate embodiments, the various processing steps 220-240 can be performed in an order other than that shown, or can be performed simultaneously. Likewise, the pair of steps 260-270 can be switched in order or be performed at the same time, and the pair of steps 290-292 can be switched or performed simultaneously. Further, the Internet communications program 40 and control network communications program 50 can be combined into a single program, can be placed into two separate units rather than a single web access interface, or can be implemented using hardware.

Figure 3:
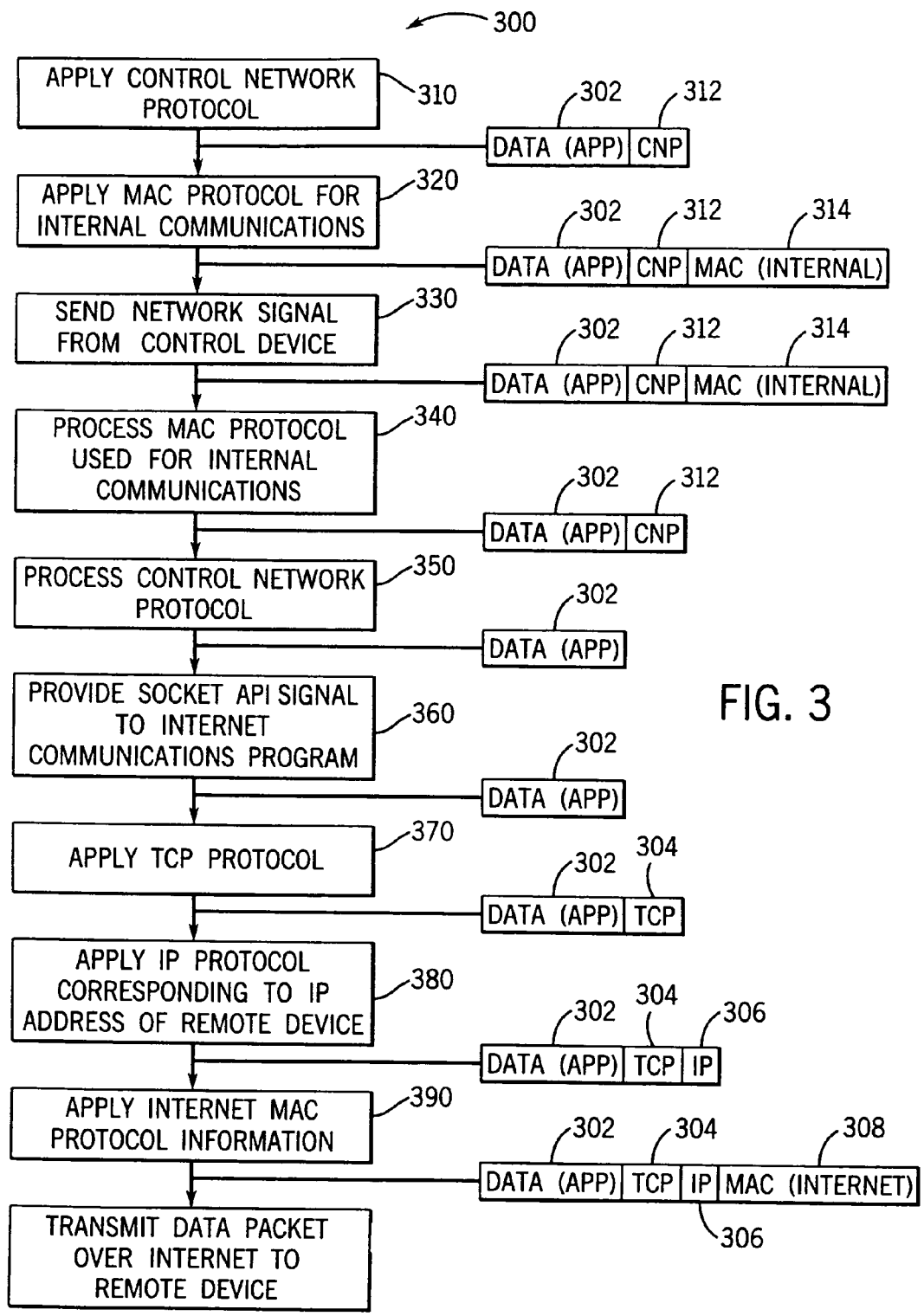
FIG. 3 is a flow chart showing exemplary steps of operation of the industrial control system of FIG. 1 concerning the communication of information from a control device of the industrial control system to a remote device.

Referring to FIG. 3, additional exemplary steps of operation of the new industrial control system 100 for providing signals from one of the control devices 110-140 to one of the remote devices 10 are shown. At step 310, the web server program of the particular control device (e.g., web server program 125 of control device 120), which has already determined application-level socket API data 302 that is to be transmitted to the remote device, performs processing to format the socket API data in accordance with the CNP protocol 312. Then at step 320, the web server program performs further processing to format the application-level data 302 (as formatted in accordance with the CNP protocol) in accordance with the internal MAC protocol information 314 to produce a network signal, which includes the internal MAC protocol 314, the CNP protocol 312, and the application-level socket API data 302. At step 330, this network signal is sent from the control device to the web access interface 30, where it is received by the control network communications program 50.

Upon receiving the network signal, the control network communications program 50 at steps 340 and 350, respectively, processes the internal MAC protocol 314 and the CNP protocol information 312, to produce the socket API signal 45. The socket API signal 45 includes only the application-level data 302 along with (in certain embodiments) relevant information concerning the address or identity of the remote device to which the application-level data is to be sent. At step 360, an appropriate IP address of the remote device is determined by the Internet communications program 40 upon receiving the socket API signal 45. Then at steps 370 and 380, respectively, the Internet communications program 40 formats the socket API signal 45 in accordance with the TCP and IP protocols 304, 306 as necessary, which can involve packetizing data for transmission over the Internet 20, and which includes specification of the address of the remote device 10 to which the application-level data 302 is to be sent. Next, at step 390, the Internet communications program 40 formats the socket API signal 45 (as formatted in accordance with the TCP/IP protocol) in accordance with the Internet MAC protocol 308 so that the signal can be transmitted by way of the Internet 20 to the remote device 10. The Internet signal communicated via the Internet 20 between the web access interface 30 and the remote device 10 therefore includes, in addition to the application-level data 302, the TCP protocol 304, the IP protocol 306 and the Internet MAC protocol 308. As with respect to steps 220-240, 260-270 and 290-292 discussed above, in alternate embodiments the various sets of processing steps 310-320, 340-350 and 370-390 can be changed in their relative ordering as well as performed simultaneously as groups of steps.

The application-level data 202,302 discussed above can include a variety of different types of data, including word processing data, graphical data, banner ads, hyperlinks, JAVA applets, and XML data. Further, the application-level data is meant to include information concerning the protocol of the application data such as file transfer protocol (FTP) information, simple mail transfer protocol (SMTP) information, telnet information, domain name system (DNS) information, and windows Internet name system (WINS) information, and also Hyper Text Transport Protocol (HTTP) information.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

We claim:

1. An industrial control system for controlling an industrial process comprising:

a plurality of control devices communicating data over a control network using a control network protocol, wherein each control device includes a respective web server program that may directly respond to and provide Internet application level socket API data and wherein each control device provide signals to or receive signals from the industrial process to control the industrial process;

a web access interface including an Internet interface and a control network interface, wherein the control network interface is coupled to the plurality of control devices by way of the control network, and wherein the Internet interface is capable of being coupled to a remote device via the Internet, the web access interface executing:

an Internet communications program executing on the web access interface that receives an Internet signal from the Internet having Internet application level socket API data and formatted in accordance with an Internet transport layer protocol and an Internet network layer protocol, wherein the Internet communications program extracts the Internet application level socket API data from the Internet signal and provides an Internet application level socket API signal including the Internet application level socket API data; and a control network communications program executing on the web access interface that receives the Internet application level socket API signal and transmits a network signal over the control network based upon the Internet application level socket API signal to an appropriate one of the control devices selected in accordance with the Internet signal for response to the Internet application level socket API data, wherein the Internet application level socket API data is included within the network signal and processed by the respective web server program at the one of the control devices, and wherein the network signal is formatted and transmitted according to a protocol of the control network and not formatted or transmitted in accordance with any Internet transport layer protocol and any Internet network layer protocol.

2. The industrial control system of claim 1, wherein the control network communications program further receives an additional network signal from another of the control devices and provides an additional Internet application level socket API signal based upon the additional network signal, wherein both the additional network signal and the additional Internet application level socket API signal include application-level information; and wherein the Internet communications program receives the additional socket API signal and formats the additional Internet application level socket API signal in accordance with the Internet transport layer protocol and the Internet network layer protocol for transmission over the Internet to an additional remote device.

3. The industrial control system of claim 1, wherein the control network communications program encodes the Internet application level socket API data from the Internet application level socket API signal with a second protocol different from the Internet transport layer protocol and an Internet network layer protocol, whereby the control devices can provide web functionality without the overhead of an Internet transport layer protocol and an Internet network layer protocol.

4. The industrial control system of claim 1, wherein the Internet communications program includes a first software program for processing an Internet media access control protocol with respect to the Internet signal.

5. The industrial control system of claim 4, wherein the Internet media access control protocol is one of an Ethernet protocol, a Token Ring protocol, a FDDI protocol, an ATM protocol, a SONET protocol, an X.25 protocol, and a frame relay protocol.

6. The industrial control system of claim 4, wherein the Internet communications program includes a second software program for processing an IP protocol with respect to the Internet signal, wherein the processing includes obtaining an IP address.

7. The industrial control system of claim 6, wherein the Internet communications program includes a third software program for processing a TCP protocol with respect to the Internet signal.

8. The industrial control system of claim 1, wherein the web server program implements at least one of an HTTP, an FTP, an SMTP, a Telnet command, a DNS command, and a WINS command based upon the socket API data.

9. The industrial control system of claim 1, wherein the control network communications program includes a first program for formatting the Internet application level socket API signal in accordance with an internal media access protocol.

10. A method of communicating information in an industrial control system for controlling an industrial process, the industrial control system having:

a plurality of control devices communicating data over a control network using a control network protocol, wherein each control device includes a respective web server program that may directly respond to and provide Internet application level socket API data and wherein each control device provide signals to or receive signals from the industrial process to control the industrial process;

a web access interface including an Internet interface and a control network interface, wherein the control network interface is coupled to the plurality of control devices by way of the control network, and wherein the Internet interface is capable of being coupled to a remote device via the Internet, the web access interface executing:

an Internet communications program executing on the web access interface that receives an Internet signal from the Internet having Internet application level socket API data and formatted in accordance with an Internet transport layer protocol and an Internet network layer protocol, wherein the Internet communications program extracts the Internet application level socket API data from the Internet signal and provides an Internet application level socket API signal including the Internet application level socket API data; and a control network communications program executing on the web access interface that receives the Internet application level socket API signal and transmits a network signal over the control network based upon the Internet application level socket API signal to an appropriate one of the control devices selected in accordance with the Internet signal for response to the Internet application level socket API data, wherein the Internet application level socket API data is included within the network signal and processed by the respective web server program at the one of the control devices, and wherein the network signal is formatted and transmitted according to a protocol of the control network and not formatted or transmitted in accordance with any Internet transport layer protocol and any Internet network layer protocol;

the method comprising the steps of:

receiving a request signal at the web access interface, wherein the request signal has been provided over the Internet from the remote device;

processing an Internet media access control protocol and a TCP/IP protocol with respect to the request signal by way of the Internet communications program of the web access interface, in order to extract Internet application level socket API data in the form of a Internet application level socket API signal;

determining an appropriate destination control device from among the plurality of control devices;

formatting the Internet application level socket API signal in accordance with the control network protocol and an internal media access control protocol to produce a network signal; and delivering the network signal to the appropriate destination control device so that the Internet application level socket API data can be processed by the respective server program.

11. The method of claim 10, further comprising:

providing an additional network signal from one of the plurality of control devices to the web access interface, wherein the additional network signal includes additional Internet application level socket API data;

processing the additional network signal with respect to the control network protocol and the internal media access control protocol to produce an additional Internet application level socket API signal;

formatting the additional Internet application level socket API signal in accordance with the TCP/IP protocol and the Internet media access control protocol to generate an Internet signal; and providing the Internet signal onto the Internet for transmission to an additional remote device.

12. The method of claim 11, wherein the Internet signal is transmitted as a series of separate data packets.

* * * * *